United States Patent Office 3,036,084
Patented May 22, 1962

3,036,084
NEW OXAZOLE COMPOUNDS
Max Duennenberger, Birsfelden, Erwin Maeder, Muenchenstein, and Adolf Emil Siegrist, Basel, Switzerland, assignors to Ciba Limited, Basel, Switzerland, a Swiss firm
No Drawing. Filed May 18, 1959, Ser. No. 813,684
Claims priority, application Switzerland May 23, 1958
3 Claims. (Cl. 260—296)

This invention provides new oxazole compounds of the general formula (1) 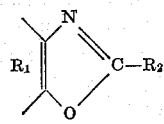

in which $R_1$ represents a radical of the benzene series fused on to the oxazole ring in the manner indicated by the valency bonds and which radical may contain substituents, and $R_2$ represents a pyridine radical linked in the 3- or 4-position to the oxazole ring.

The invention also provides a process for the manufacture of the aforesaid new oxazole compounds, wherein an acyl-compound, which is derived from a carboxylic acid, of which the carboxyl group is bound to a pyridine ring in the 3- or 4-position, and an ortho-amino-hydroxyaryl-compound of the benzene series, is heated and/or treated with an agent capable of splitting off water. Alternatively, the new oxazole compounds can be obtained by heating, advantageously, in the presence of an agent capable of splitting off water, an ortho-amino-hydroxy-compound of the benzene series containing a primary amino group with a carboxylic acid of which the carboxyl group is bound to a pyridine ring in the 3- or 4- position, or a functional derivative of said acid, for example, an alkyl ester thereof.

Among the oxazole compounds of this invention, for example, those of the general Formula 1, there are especially valuable compounds of the general formula (2) 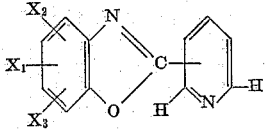

in which $X_1$ represents a hydrogen or chlorine atom or a lower alkyl group or a phenyl radical, and $X_2$ and $X_3$ each represent a hydrogen atom or a chlorine atom.

In making the new oxazole compounds from the ortho-amino-hydroxy-compounds the reaction may be carried out in the absence of a solvent or in the presence of an organic solvent of high boiling point. As agents capable of splitting off water there may be used, for example, boric acid, which has a catalytic influence on the splitting off of water. It is especially advantageous to carry out the reaction in the presence of an excess of polyphosphoric acid. This compound acts both as a solvent for the starting material and the final product and as an agent capable of splitting off water.

As stated above, the oxazole compounds can also be made by heating and/or treating with an agent capable of splitting off water an acyl-compound which is derived from a pyridine carboxylic acid containing the carboxyl group in the 3- or 4-position and an ortho-amino-hydroxy-aryl-compound of the benzene series containing a primary amino group. The acyl-compounds used as starting materials, which advantageously correspond to the general formula (3) 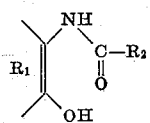

in which $R_1$ represents a radical of the benzene series bound to the HO- and —NH-groups in the manner indicated by the valency bonds, and which radical may contain substituents, and $R_2$ represents a pyridine radical linked in the 3- or 4-position to the carbon atom in the above Formula 3, can be obtained by reacting the ortho-amino-hydroxyaryl-compound with a nicotinic acid halide or isonicotinic acid halide, advantageously the acid chloride. The splitting off of water from the acyl-compounds may be carried out in the manner described above for the reaction of the ortho-amino-hydroxyaryl-compounds with nicotinic or isonicotinic acids. As another agent for spliting off water there may be mentioned a zinc chloride melt.

The oxazole compounds so obtained or the starting materials of the above kind used for making them, may be free from or contain further substituents. The ortho-amino-hydroxyaryl-compounds of the benzene series may contain as nuclear substituents, for example, lower alkyl or alkoxy groups, especially methyl or methoxy groups; phenyl-radicals or chlorine atoms. There are advantageously used ortho-amino-hydroxy-compounds of the formula (4) 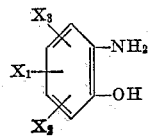

in which $X_1$ represents a hydrogen or chlorine atom or a lower alkyl or alkoxy group or a phenyl radical, and $X_2$ and $X_3$ each represent a hydrogen atom or a chlorine atom.

As examples of suitable starting materials there may be mentioned:

1-amino-2-hydroxybenzene,
1-amino-2-hydroxy-4- or -5-methyl-benzene,
1-amino-2-hydroxy-3:5-dimethylbenzene,
1-amino-2-hydroxy-5-tertiarybutyl-benzene,
1-amino-2-hydroxy-5-chlorobenzene,
1-amino-2-hydroxy-3:5-dichlorobenzene and
1-amino-2-hydroxy-3:5:6-trichlorobenzene.

The nicotinic or isonicotinic acids or functional derivatives thereof used as starting materials advantageously contain an acid radical of the constitution (5) 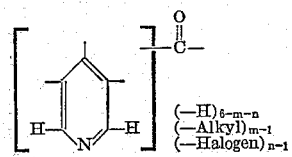

in which $m$ and $n$ each represent the whole number 1, 2 or 3, and the sum $m+n$ is not greater than 4. Thus, the nicotinic or isonicotinic acids are those which contain no further substituents in the nucleus ($m=n=1$) or contain one ($m=2$; $n=1$) or two ($m=3$; $n=1$) alkyl groups, advantageously methyl and/or ethyl groups, or one ($n=2$; $m=1$) or two ($n=3$; $m=1$) halogen atoms, advantageously chlorine, or one alkyl group and one halogen atom ($m=2$; $n=2$). The —CO— group may be bound to the pyridine ring advantageously in the 3-position.

As examples of acids of the formula $R_2$—COOH and halides thereof there may be mentioned:

Pyridine carboxylic acid-(3) (nicotinic acid),
Pyridine carboxylic acid-(4) (isonicotinic acid),
5- or 6-chloro-pyridine carboxylic acid-(3),
2:6- or 5:6-dichloro-pyridine carboxylic acid-(3),
2:6-dichloro-pyridine carboxylic acid-(4),
4-, 5- or 6-methyl-pyridine carboxylic acid-(3),
2-methyl-pyridine carboxylic acid-(4),
4-ethyl-pyridine carboxylic acid-(3),
3-ethyl-pyridine carboxylic acid-(4),
2:4- or 2:6-dimethyl-pyridine carboxylic acid-(3), and
6-chloro-2-methyl-pyridine carboxylic acid-(4).

The new oxazole compounds are useful as agents for affording protection against ultra-violet rays (light screening agents). There may be mentioned the three following methods of using them:

A. The light screening agent is incorporated in a substratum in order to protect the substratum from the action of ultra-violet rays.

B. The light-screening agent is incorporated in a substratum in order to protect one or more other substances, for example, dyestuffs or assistants, incorporated in the substratum.

C. The light-screening agent is incorporated in a "filter layer" for the purpose of protecting against the action of ultra-violet rays a substratum located directly beneath the filter layer or at a short distance therefrom (for example, in a shop window).

As materials to be protected there may be mentioned:

(a) Textile materials; such textile materials may consist of natural materials of animal origin, such as wool or silk, or of vegetable origin, such as cellulosic materials of cotton, hemp, flax, linen or jute or ramie, and also semi-synthetic materials, such as regenerated cellulose, for example, artificial silk viscoses, including staple fibers of regenerated cellulose, or synthetic materials such as are obtainable by polymerisation or copolymerisation for example, polyacrylonitrile, or those obtainable by polycondensation, such as polyesters and especially polyamides.

(b) Fibrous materials of other kinds (that is to say not textile materials) which may be of animal origin, such as feathers, hair, straw, wood, wood pulp or fibrous materials consisting of compacted fibers, such as paper, cardboard or compressed wood, and also materials made from the latter; and also paper masses, for example, hollander masses, used for making paper.

(c) Coating or dressing agent for textiles or paper.
(d) Lacquers or films of various compositions.
(e) Natural or synthetic resins.
(f) Hydrophobic oily, fatty or wax-like substances.
(g) Natural rubber-like materials.
(h) Cosmetic preparations.
(i) Filter layers for photographic purposes, especially for color photography.

It will be understood that the light-screening agents are useful not only for undyed but also for dyed or pigmented materials. In this case the light screening agent also protects the dyestuffs, and in some cases a very considerable improvement in fastness to light is achieved. If desired, the treatment with the light-screening agent and the dyeing or pigmenting process may be combined with one another.

Depending on the nature of the material to be treated, the requirements with regard to the degree of activity and durability and other factors the proportion of the light-screening agent to be incorporated in the material may vary within fairly wide limits, for example, from about 0.01 to 10%, and advantageously 0.1% to 2%, on the weight of the material which is to be directly protected against the action of ultra-violet rays.

The oxazole compounds of this invention also possess a good bactericidal or bacteriostatic and fungicidal or fungistatic action and can therefore be used with advantage as gross or fine disinfecting agents. They are especially suitable for use in hospitals, the food industry, dairies and breweries, as they possess a good activity against both bacteria and moulds.

The disinfecting agents of this invention can also be used together with rinsing agents or especially detergents for textile materials. The oxazole compounds are absorbed from the aqueous rinsing or washing liquors substantively by the treated materials, for example, cotton, and the materials are thus effectively protected against the attack of micro-organisms that are harmful to textiles or cause disease.

In general it suffices to add a very small amount within the range of a few parts per mil to a few parts percent of the disinfecting agent to a detergent. The proportion depends mainly on the substantivity of the disinfecting agent and on the purpose for which the detergent is to be used.

As materials to be treated in the above manner there may be mentioned more especially cellulosic materials. As such materials there may be mentioned cellulose, and also textile materials of cotton, linen, hemp, flax or jute, regenerated cellulose including staple fibers of regenerated cellulose. It is also possible to treat silk or wool, or synthetic fibers, such as polyacrylonitrile or polyamide fibers, or mixed fabrics which consist of different kinds of fibers. Articles of wood, for example, casks in the beverage industry, can also be cleaned.

As detergents which may be used in conjunction with the disinfecting agents of this invention there may be mentioned, soaps, salts of sulfonate detergents, for example, salts of sulfonated benzimidazoles substituted by a higher alkyl radical at the 2-carbon atom, and also salts of monocarboxylic acid esters of 4-sulfophthalic acid with higher fatty alcohols, or salts of fatty alcohol sulfonates, alkyl-aryl sulfonic acids or condensation products of higher fatty acids with aliphatic hydroxy- or amino-sulfonic acids. There may also be used non-ionic detergents, for example, polyglycol ethers derived from ethylene oxide and higher fatty alcohols, alkylphenols or fatty amines.

Such detergents may be admixed with the usual additions for detergents, such as alkali metal carbonates, phosphates, pyrophosphates, polyphosphates, metaphosphates, silicates, perborates or percarbonates. There may also be prepared detergents which consist wholly or for the greater part of inorganic compounds having a cleaning action and disinfecting agents of this invention.

Such detergents may contain, in addition to the oxazole compounds having a disinfecting action, insecticides, other bactericides, dyestuffs or optical bleaching agents.

Mixtures of the detergents with the disinfecting agents of the invention can be prepared in a simple manner by mixing and/or grinding the components together. It may be of advantage in order to facilitate distribution to use one or other of the components in the dissolved or molten state. The detergents can be made up in the ordinary commercial forms, for example, as powder, flakes, pieces, shavings or pastes.

The oxazole compounds of the invention are also suitable for disinfecting the skin against attack by bacteria or moulds, for example, dermatophytes. They may be used alone or in admixture in solution or as emulsions and/or with other active or inert substances, such as salves or in the form of dry powders.

The oxazole compounds can also be used with advantage for disinfecting instruments.

Especially favourable for the above uses is the fact that the disinfecting action of the new oxazole compounds is not destroyed by soaps or by serum.

The following examples illustrate the invention, the parts and percentages being by weight unless otherwise stated, and the relationship of parts by weight to parts by volume being the same as that of the kilogram to the liter, and the melting points being uncorrected.

Example 1

12.3 parts of 1-amino-2-hydroxy-5-methylbenzene, 12.3 parts of isonicotinic acid and 200 parts of polyphosphoric acid are stirred with exclusion of air for 3½ hours at 240 to 245° C. The mixture is then cooled to 100° C., poured over 300 parts of ice and alkalinized with sodium hydroxide solution of 30% strength. The precipitate is suctioned off, washed with water until neutral and then dried, to yield about 18 parts of the compound of the formula (6)
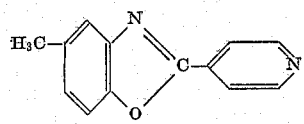

After having been recrystallized three times from aqueous alcohol it forms colorless prisms melting at 134 to 134.5° C.

*Analysis.*—$C_{13}H_{10}ON_2$.—Calculated: C, 74.27; H, 4.79; N, 13.33%. Found: C, 74.17; H, 4.93; N, 13.21%. $\lambda_{max}=309m\mu$ ($\epsilon=19,000$).

The compound of the formula (7)
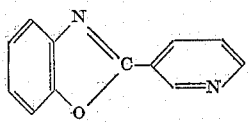

can be prepared from 1-amino-2-hydroxybenzene and nicotinic acid as described above.

After the crude product has been recrystallized 5 times from aqueous alcohol, it is obtained in the form of colorless crystals melting at 109–110° C.

*Analysis.*—$C_{12}H_8ON_2$.—Calculated: C, 73.46; H, 4.11; N, 14.28%. Found: C, 73.54; H, 4.14; N, 14.47%. $\lambda_{max_1}=294m\mu$ ($\epsilon=21,300$). $\lambda_{max_2}=302m\mu$ ($\epsilon=22,000$).

The compounds of Formulae 6 and 7 are suitable as light-screening agents and are added, for example, with advantage to acetylcellulose solutions intended to form a protective film against the action of ultra-violet rays. These agents can also be used for protection against attacks by bacteria and fungi, for example on cotton fabrics.

Example 2

When the isonicotinic acid used in Example 1 is replaced by an equal amount of nicotinic acid, and the reaction is performed with an appropriate amount of 1-amino-2-hydroxy-5-methylbenzene, the compound of the formula 8)
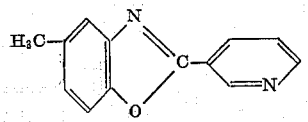

is obtained, which, after having been recrystallized twice from aqueous alcohol, forms colorless crystals melting at 102–102.5° C.

*Analysis.*—$C_{13}H_{10}ON_2$.—Calculated: C, 74.27; H, 4.79; N, 13.33%. Found: C, 74.37; H, 4.70; N, 13.38%. $\lambda_{max_1}=230m\mu$ ($\epsilon=9,200$). $\lambda_{max_2}=308m\mu$ ($\epsilon=20,000$).

The compound of the Formula 8 is likewise an efficient light-screening agent and can be added, for example, to the conventional cosmetic salves, emulsions, solutions and the like, whereby these preparations are turned into valuable protectives against sunlight. The compound of the Formula 8 is also suitable as a disinfectant against bacteria and fungi, and for this purpose it can be added, for example, to conventional detergents and cleansers.

Example 3

9 parts of 1-amino-2-hydroxy-5-phenylbenzene, 6 parts of nicotinic acid and 100 parts of polyphosphoric acid are stirred with exclusion of air for 4 hours at 240 to 245° C. The conventional working up yields the reaction product of the formula (9)
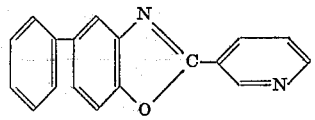

The analytically pure product, obtained after recrystallizing the crude product twice from aqueous alcohol, melts at 138–139° C.

*Analysis.*—$C_{18}H_{12}ON_2$.—Calculated: C, 79.39; H, 4.44; N, 10.29%. Found: C, 79.37; H, 4.30; N, 10.16%. $\lambda_{max_1}=250m\mu$ ($\epsilon=26,600$). $\lambda_{max_2}=313m\mu$ ($\epsilon=19,300$).

The compound of the Formula 9 is also an efficient means for protection against ultra-violet rays and can be added, for example, to a vinyl resin lacquer to improve the fastness to light of the coloring. The compound further has valuable good bactericidal or bacteriostatic and fungicidal or fungistatic properties and can be used as a disinfectant, for example in conjunction with a cleanser.

Example 4

14.3 parts of 1-amino-2-hydroxy-5-chlorobenzene, 12.3 parts of nicotinic acid and 200 parts of polyphosphoric acid are stirred with exclusion of air for 2½ hours at 240 to 245° C. After the usual working up there are obtained about 19 parts of the compound of the formula

(10)
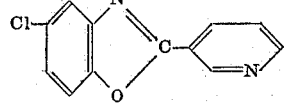

The analytically pure product, obtained after having recrystallized the crude product three times from aqueous alcohol, melts at 153–154.4° C.

*Analysis.*—$C_{12}H_7ON_2Cl$.—Calculated: C, 62.49; H, 3.05; N, 12.15%. Found: C, 62.42; H, 3.12; N, 12.19%. $\lambda_{max}=305\ m\mu$ ($\epsilon=20,800$).

When 1-amino-2-hydroxy-5-chlorobenzene is replaced by 21.3 parts of 1-amino-2-hydroxy-3:5:6-trichlorobenzene, the compound of the formula

(11)
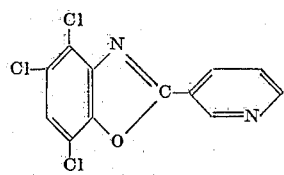

is obtained in the form of colorless needles. After having been recrystallized 3 times from dimethyl formamide the product melts at 171.5 to 172° C.

*Analysis.*—$C_{12}H_5ON_2Cl_3$.—Calculated: C, 48.11; H, 1.68; N, 9.35%. Found: C, 48.19; H, 1.70; N, 9.36%. $\lambda_{max_1}=296\ m\mu$ ($\epsilon=21,000$). $\lambda_{max_2}=306\ m\mu$ ($\epsilon=20,800$).

The compounds of the Formulae 10 and 11 are suitable as agents affording protection from ultra-violet rays and are added with advantage, for example, to a colored paper pulp in the hollander in order to improve the fastness to light of the paper.

These compounds are further suitable for protection from attacks by microorganisms, for example on textile fabrics.

Example 5

10 parts of the compound of the Formula 8, 11 parts of para-chlorobenzyl chloride and 60 parts of dimethyl formamide are stirred with exclusion of air for 4 hours at 240° C. One half of the dimethyl formamide is then distilled off under reduced pressure, and the reaction mixture is cooled to 0° C., whereupon the compound of the formula

(12) 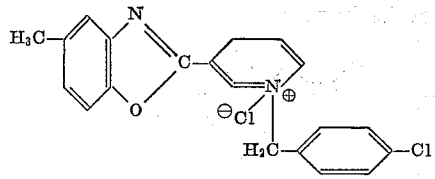

separates out in colorless prisms.

After having been recrystallized three times from a mixture of dimethyl formamide and acetone, the compound melts at 195 to 196.3° C.

Analysis.—$C_{20}H_{16}ON_2Cl_2$.—Calculated: C, 64.70; H, 4.34; N, 7.54%. Found: C, 64.71; H, 4.58; N, 7.66%. $\lambda_{max_1}$=244 m$\mu$ ($\epsilon$=12,000). $\lambda_{max_2}$=323 m$\mu$ ($\epsilon$=16,000).

The compound of the Formula 12 is a valuable light-screening agent and can be added, for example, to salves, emulsions, oils, alcoholic solutions or the like to form efficient means for protecting the skin from undesired sunlight. Moreover, the compound displays an antibacterial and antimycotic action.

Example 6

1 part of the compound of the Formula 8 is dissolved in 100 parts of ethanol and diluted with water to form a treatment liquor containing 1 gram of the active principle per liter of water. A cotton calico fabric is treated with this liquor for 30 minutes at 60° at a goods-to-liquor ratio of 1:20, then centrifuged and dried.

5 strips (9 x 2.5 cm.) each of the fabrics treated in this manner is placed on mineral salt agar, infected with a suspension of spores of *Chaetomium globsum* and then incubated for 15 days at 30° C.

The strips of fabric thus treated are not infested with fungi. A blank specimen of the fabric, treated without the compound of the Formula 8, on the other hand, is completely covered with the fungus.

When an oxazole compound of the Formula 7 or 9 is used instead of the oxazole compound described above, similar results are obtained.

Example 7

A mixture of 15 parts of sodium lauryl sulfate, 15 parts of sodium dodecyl-benzenesulfonate, 40 parts of sodium tripolyphosphate, 20 parts of sodium sulfate and 20 parts of the compound of the Formula 6 is distributed as finely as possible in about 10 liters of water. The resulting dispersion has a pronounced antibacterial and antimycotic action and has an inhibitive or lethal effect on, for example, *Staphylococcus aureus*, *Pseudomonas aeruginosa*, *Escherichia coli*, *Trichophyton interdigitale*, and *Endomyces albicans*. This action is not impaired by the simultaneous presence of soap or of a serum.

A mixture or dispersion of the above composition, which contains the compound of the Formula 8 instead of the compound of the Formula 6, possesses similar antibacterial and antimycotic properties.

Example 8

A film of about 40$\mu$ thickness is made from a 10% acetonic solution of acetylcellulose which, calculated from acetylcellulose, contains 1% of the compound of the Formula 9 obtained as described in Example 3. After having been dried, the film reveals the following percentual values of light transmission:

| Wavelength in m$\mu$ | Percentage light transmission | |
|---|---|---|
| | unexposed | exposed for 100 hours in a fadeometer |
| 260 to 330 | 0 | 0 |
| 340 | 7 | 7 |
| 350 | 47 | 47 |
| 360 | 80 | 80 |

When one of the compounds of the Formula 6, 7 or 8 is used instead of the compound of the above formula, simular results are obtained.

Example 9

50 parts of a vinyl resin lacquer consisting of 240 parts of a stabilized polyvinyl chloride (for example 228 parts of "Vinylite VMCH" of Union Carbide and Carbon Corporation, stabilized with 12.4 parts of "Stabiliser No. 52" of Advance Solvents) and 24.6 parts of dioctyl phthalate, 367.5 parts of methylethyl ketone and 267.5 parts of toluene are mixed at room temperature for 10 minutes with a solution of 0.133 part of copper phthalocyanine-tetramethoxypropyl-sulfamide, and 0.133 part of the light-screening agent of the Formula 7, obtained as described in Example 1, in 11.5 parts of acetone.

A piece of tinfoil is covered with a wet film of 0.2 mm. thickness of the above preparation with the aid of a film coating apparatus, dried for 5 minutes at 120° C. and then cooled. A film of equal thickness is produced on top of the first film; the second film is of the same composition as the first except that it does not contain the afore-mentioned dyestuff. The whole is then dried for 5 minutes at 120° C. The resulting blue two-ply lacquer film displays after exposure in a fadeometer better fastness to light than a film that does not contain the light-screening agent of the Formula 7. An addition of any one of the compounds of the Formulae 8 to 12 produces an analogous effect.

What is claimed is:

1. The oxazole compound of the formula

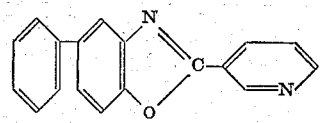

2. The oxazole compound of the formula

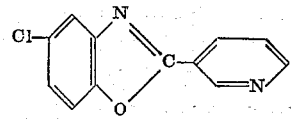

3. The oxazole compound of the formula

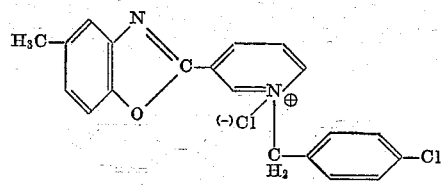

References Cited in the file of this patent
UNITED STATES PATENTS

| 2,918,402 | Frederick | Dec. 22, 1959 |
| 2,929,819 | Erlenmeyer | Mar. 22, 1960 |
| 2,945,042 | Ferguson | July 12, 1960 |

OTHER REFERENCES

Harkins et al.: J. Am. Chem. Soc., vol. 78, pp. 260–4 (1956).